Feb. 15, 1938.  G. RAYMOND  2,108,234
VALVE
Filed June 1, 1936  2 Sheets-Sheet 1
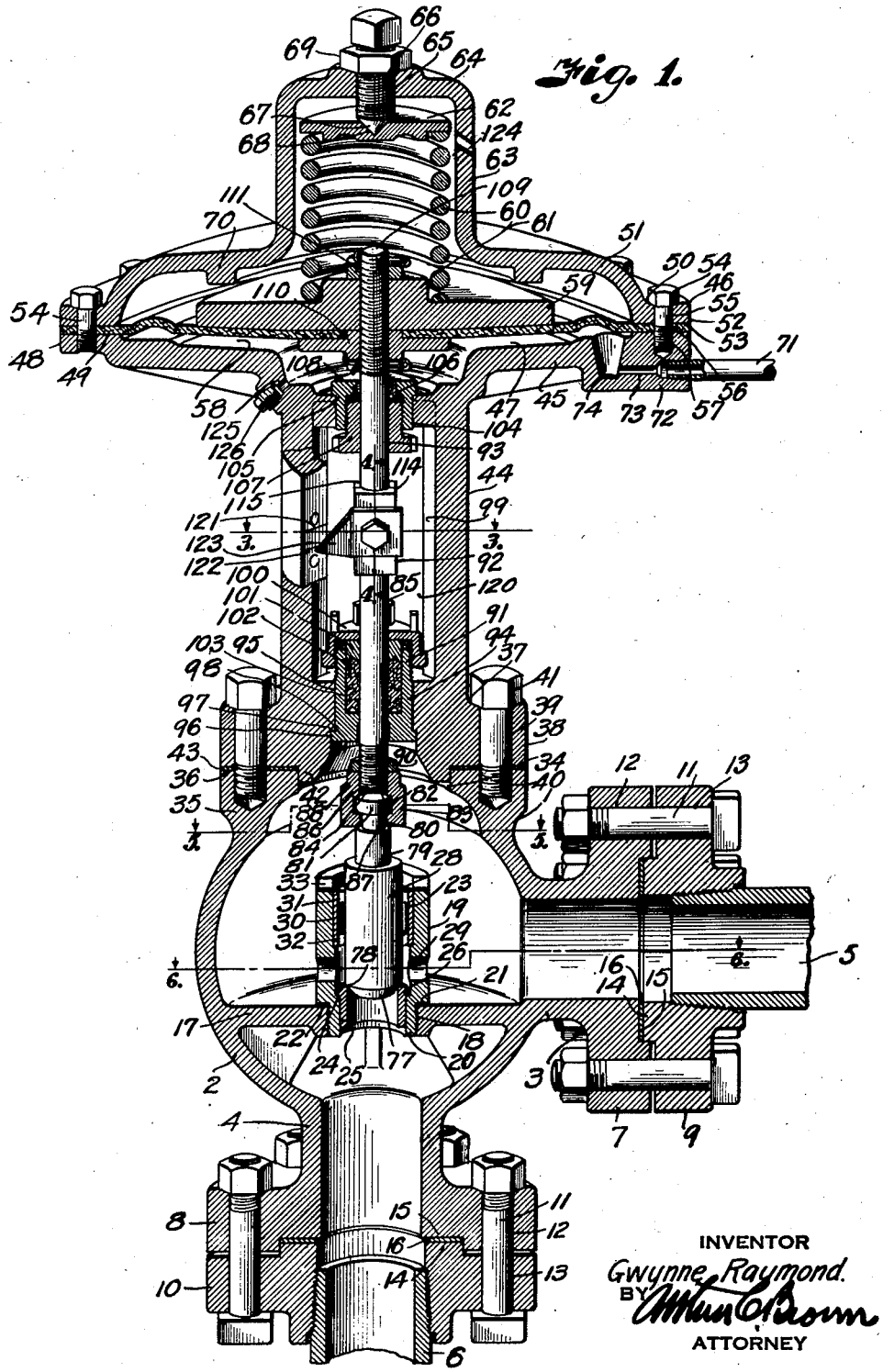
INVENTOR
Gwynne Raymond.
BY
ATTORNEY

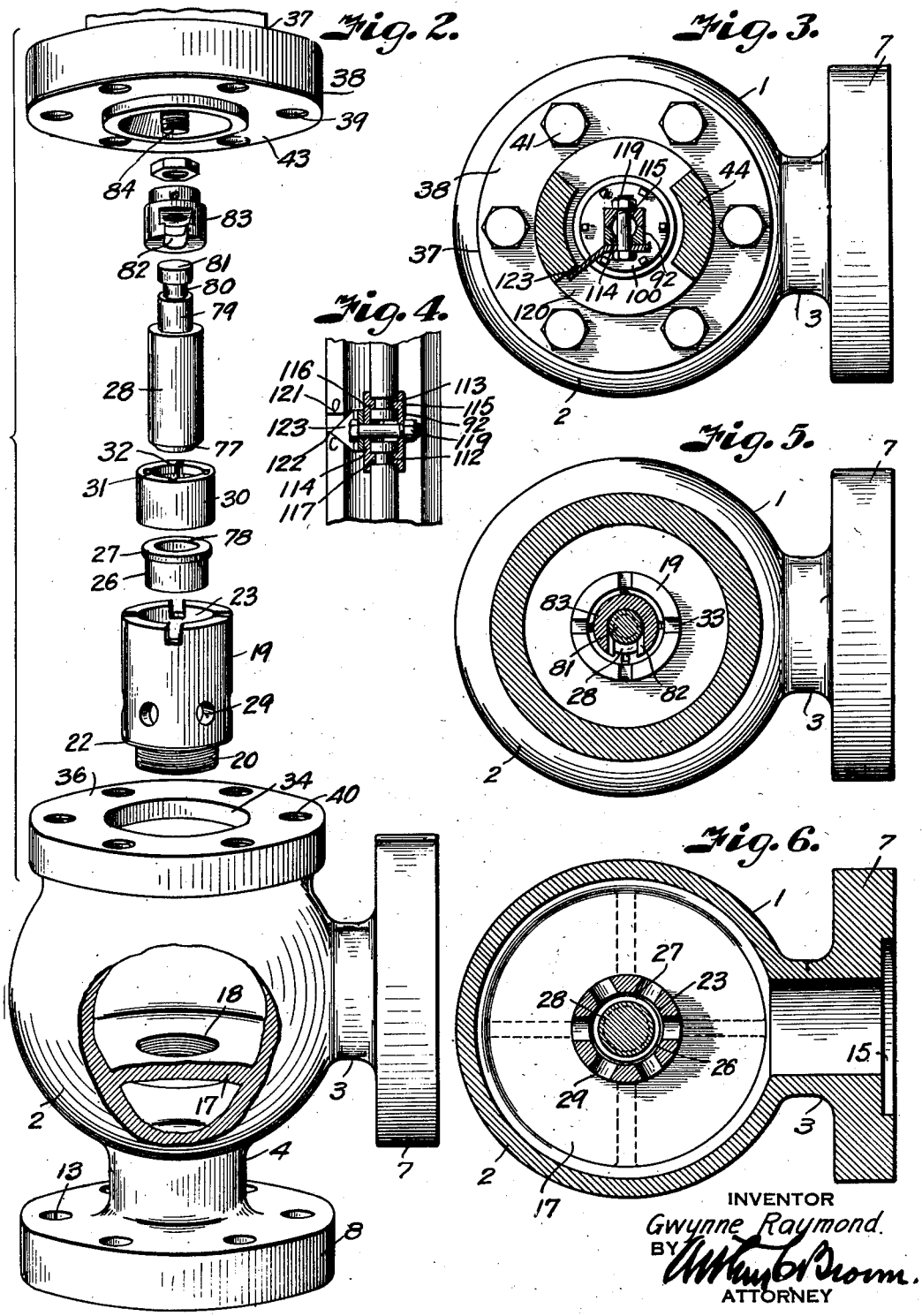

Patented Feb. 15, 1938

2,108,234

UNITED STATES PATENT OFFICE 2,108,234

VALVE

Gwynne Raymond, Oklahoma City, Okla., assignor to Black, Sivalls & Bryson, Inc., Oklahoma City, Okla., a corporation of Maine Application June 1, 1936, Serial No. 82,825

4 Claims. (Cl. 251—27)

This invention relates to valves, particularly to those for use in high pressure lines, and has for its principal object to provide a valve of this character constructed to preclude cutting of the valve member in its seat incidental to sudden fluid rushes upon opening of the valve.

Other important objects of the invention are to provide a quick-acting, tight-fitting and full-stroke valving member; to provide a valve construction permitting use of hard, high tensile strength materials; to prevent corrosion of the valving member and its seat; and to provide a valve construction capable of being quickly dismantled for inspection and repairs.

In accomplishing these and other objects of the invention, I have provided improved details of construction, the preferred form of which is illustrated in the accompanying drawings, wherein:

Fig. 1 is a perspective view through a diaphragm actuated valve constructed in accordance with the present invention and showing the valving member in seated position to close flow through the valve.

Fig. 2 is a detail perspective view of the valve body and valving parts shown in disassembled spaced relation to better illustrate their construction.

Fig. 3 is a cross-section through the valve bonnet and actuating stem on the line 3—3 of Fig. 1.

Fig. 4 is a detail section through the valve actuating stem on the line 4—4 of Fig. 1.

Fig. 5 is a horizontal section through the valve body on the line 5—5 of Fig. 1; and Fig. 6 is a similar section through the valve body on the line 6—6 of Fig. 1.

Referring more in detail to the drawings:

1 designates a motor actuated valve constructed in accordance with the present invention, and which includes a substantially globular valve body 2, having inlet and outlet connections 3 and 4 adapted to be connected with the sections 5 and 6 of a high pressure flow line. In the illustrated instance, the connections 3 and 4 are in the form of tubular necks extending at right angles to each other from the valve body and provided with peripheral flanges 7 and 8 adapted to be connected with similar flanges 9 and 10 on the flow line sections by means of suitable fastening devices, such as bolts 11, extending through openings 12 and 13 in the respective flanges, as clearly shown in Fig. 1. The flanges 7—9 and 8—10 have interfitting annular tongues, and grooves 14 and 15 between which sealing gaskets 16 are inserted to enhance the fluid tight character of the joints.

Formed within the valve body, between the inlet and outlet connections thereof, is a partition or diaphragm 17 having a centrally threaded opening 18 for mounting a valve cage member 19. The valve cage member 19 includes a sleeve-like body having a reduced end 20 threadedly engaged within the threaded opening 18, the reduced threaded end forming a stop shoulder 21 to engage against the gasket ring 22 that seats against the upper face of the partition 17.

The valve cage 19 has an axial cylindrical bore 23 extending from the upper end thereof to a point adjacent the shoulder 21 where it terminates in an inner, annular shoulder 24 formed by a reduced continuation 25 of the bore. Pressed within the bore is a valve seat member 26, having a skirt portion engaged within the portion 25 of the bore and an annular flange 27 that is engaged against the internal annular shoulder 24 to support the valve seat against downward movement within the bore under thrusts of the valving member 28, later described.

Extending through the walls of the cage 19, at a point above the valve seat member, is a plurality of radial ports 29 through which fluid flows from the inlet to outlet sides of the valve. The cage 19 is of sufficient length to support an annular adapter ring 30 that is pressed into the bore and has its lower end seating against an annular shoulder extending circumferentially of the bore at a point above the radial ports 29.

The adapter ring has a press fit within the valve cage and has its inner face provided with spaced ribs 31 for slidingly guiding the valving member to and from engagement with its seat. The ribs 31 are preferably grooved longitudinally of the adapter ring, as at 32, to provide relief passages for sand or other foreign material contained in the fluid flowing through the valve which may lodge between the ring and valving member and that might not be able to work out because of the normally snug fit between the respective parts.

In order to facilitate threading of the valve cage within the valve body the upper end thereof is provided with radial notches 33 whereby the valve cage may be engaged by a suitable wrench (not shown).

Formed in the valve body, in axial alignment with the valve cage, is an opening 34 of suitable diameter to permit ready insertion of the valve cage and to pass a valve actuating stem, as later described. The opening 34 is preferably formed in a cylindrical extension 35 of the valve body which terminates in a flat annular seat 36 to mount a valve bonnet 37.

The valve bonnet 37 may be of different shapes, depending upon the type of motor mechanism for actuating the valve. In the illustrated instance, the motor is of the diaphragm type. The bonnet, therefore, includes a seating flange 38 having openings 39 aligning with threaded sockets 40 formed in the seat 36 to accommodate cap screws 41 whereby the vave bonnet is secured to the valve body, as clearly shown in Fig. 1. To facilitate centering of the valve bonnet, and enhance the seal thereof with the valve body, the base end thereof has a reduced extension 42 engaging within the opening 34. The joint between the seating flange 38 and the seat 36 may be provided with a gasket ring 43.

The valve bonnet also includes a cylindrical post portion 44 carrying at its upper end one section 45 of a diaphragm housing 46. The diaphragm section 45 is substantially disk-shaped and has a concave upper face 47 encircled by an annularly extending flange 48 provided with a diaphragm seating face 49.

The diaphragm housing also includes a mating section 50 having a central, bell-shaped portion 51, provided with an annular flange 52, cooperating with the flange 48 to clamp the edges of a flexible diaphragm 53 therebetween, the flanges being secured in clamping relation with the diaphragm by cap screws or the like 54 threaded through suitable openings 55 in the section 50 and aligning openings 56 in the diaphragm into threaded sockets 57 in the flange of the section 45.

The diaphragm cooperates with the concave side 47 of the section 45 to form a pressure chamber 58 into which a pressure fluid is injected for actuation of the diaphragm in one direction to effect opening of the valve member 28, as later described. Carried on the upper face of the flexible diaphragm, and movable therewith, is a backing plate 59 to stiffen the diaphragm and form a seat for a coil spring 60 having an end thereof engaging about a central boss 61 of the backing plate, and its opposite end carrying a plate 62.

The coiled spring is enclosed within a cylindrical extension 63 of the housing section 50, and which has a closed end 64 provided with a central, threaded opening 65 in which is adjustably mounted a set screw 66 having a pointed terminal 67 engaging within a cone-shaped socket 68, formed in the upper face of the plate 62, whereby the spring pressure on the diaphragm may be regulated as later described. The set screw projects from the closed end of the extension 63 and carries a jamb nut 69 for retaining the set screw in its adjusted position. Upward movement of the diaphragm, in response to pressure in the chamber 58, is limited by an annular, depending rib 70 projecting from the lower face of the bell-shaped portion of the upper housing section.

The pressure medium for actuating the diaphragm is supplied and exhausted from the pressure chamber 58 through a pipe 71 threaded within a boss 72 formed in the lower section 45 and having a channel 73 communicating with the chamber 58 through a port 74.

The valving member 28, above referred to, includes a cylindrical body snugly reciprocable within the adapter ring, and has its lower end provided with an annular, bevelled face 77 adapted to engage a seat 78 formed in the valve seat member 26. The opposite end of the valving member terminates in a reduced neck 79 that is provided with an annular groove 80 to form a head 81 engaged within an undercut recess 82 of a cross-head 83.

The cross-head 83 is threadedly mounted on the threaded end 84 of an actuating stem 85, the threaded end 84 of the stem being mounted in a threaded opening 86 in the cross-head and secured by a pin 87 extending through a boss 88 on the cross-head and through the threaded end of the rod. The rod is further secured by a jamb nut 90, threaded on the stem and engaging against the boss, as clearly shown in Fig. 1. The stem 85 extends upwardly through a suitable stuffing box 91, and is connected by a coupling 92 with a diaphragm stem 93 whereby the valve is opened responsive to movement of the diaphragm.

The stuffing box 91 includes a bushing 94 pressed within an axial bore 95 formed within the lower end of the bonnet, and which has a flange 96 seated against an annular shoulder 97 that is formed by an enlarged portion 98 of the bore.

The upper end of the bushing projects into an enlarged, central chamber 99, formed within the post 44, and is provided with an adjusting nut 100 that is threaded on the bushing to engage against a gland 101, which acts to compress a packing element 102 contained within a packing chamber 103 that is formed within the bushing.

The diaphragm stem is reciprocably mounted within a similar stuffing box 104 including a bushing 105 having a packing chamber 106 into which is threaded an adjusting nut 107 to tighten a packing 108 about the stem. The diaphragm stem projects within the diaphragm and has a threaded end 109 mounting a nut 110 for cooperating with the backing plate 59 to clamp the stem to the diaphragm. The stem is also threadedly engaged with the backing plate and secured against relative rotation therewith by a jamb nut 111, as shown in Fig. 1.

The adjacent ends of stems 85 and 93 are provided with annular grooves 112 and 113 to mount the coupling 92. The coupling 92 includes mating sections 114 and 115 having internal, annular ribs 116 and 117 in the respective ends thereof for engaging in the grooves. The mating sections of the coupling are held together by a bolt 119 extending therethrough, as shown in Fig. 4.

The tubular post is provided with side openings 120 through which the packing nuts are readily adjusted. The side of one of the openings is provided with indicator marks 121 and 122 for respectively marking the open and closed positions of the valving member, as indicated by a suitable pointer 123 carried on the bolt 119 and movable over the marks.

The upper diaphragm chamber is vented to atmosphere through vent openings 124, formed in the side of the spring housing 63, and the lower chamber is provided with a suitable drain opening 125 that is normally closed by a threaded plug 126 to draw off any condensation or scale that might accumulate in the diaphragm chamber.

Attention is here directed to the fact that the shape of the valving member, its seat, and associated parts permit their construction of hard metals having high tensile strength and metals that are not subject to corrosion by the fluid flowing through the valve.

In operating a valve constructed and assembled as described, fluid is injected into the diaphragm chamber 58 through the pipe 71 and at a suitable pressure to cause movement of the diaphragm against action of the spring 60, the spring being so loaded with respect to the pressure that the diaphragm will be moved to lift the valve stem and cause full opening of the valving member from its seat. Flow is then established from the inlet 3 through radial ports 29 and the valve seat member 26 to the outlet side 4 of the valve.

Owing to the fact that the valving member is lifted directly from its seat responsive to movement of the diaphragm the valve is fully opened thereby eliminating any wire drawing effects of the fluid that would tend to cut the valving member or the valve seats. The valving member also has a substantially tight fit within the adapter ring so as to prevent any pounding action incidental to surge of fluid through the valve. When the valve is closed, the unbalanced pressure across the valve is additive to the spring pressure in keeping the valve closed gas tight; but when pressure is admitted into the chamber 58 under the diaphragm, and the valve plug 28 leaves its seat, the line pressure acts against the plug and is additive to the pressure against the diaphragm in compressing the spring and effecting quick, full-stroke action of the valve.

When it is necessary to inspect or repair the valve, the valve bonnet, including the pressure diaphragm, may be removed as a unit by removing the cap screws 41 and lifting the bonnet sufficiently to clear the extension 42, whereupon the bonnet may be shifted laterally to release the head of the valving member from the cross-head of the actuating stem. The valving member may then be readily removed through the opening 34, and then the cage may be completely removed by unthreading it from the opening 18.

Should it be desirable to use different size valving members and seating rings, the adapter and valve seat rings of the desired inner diameter may be substituted by pressing them into the bore of the valve cage. While the valving members may be of different diameter all of them may have the same size heads so that they are adapted to the cross-head of the actuating stem.

From the foregoing it is apparent that I have provided a valve construction wherein the valving parts may be constructed of materials that can be readily tempered to the proper degree of hardness so as to withstand the pressure and any cutting action of the fluid moving through the valve. Also owing to the fact that the valve is open widely upon actuation of the diaphragm, cutting of the fluid is reduced to a minimum since the valve is immediately opened to its full capacity. The valve parts may also be constructed of materials to prevent corrosive action of the fluid on the respective parts.

While I have particularly described my invention as being actuated by a diaphragm mechanism, it is obvious that other means may be employed for lifting the valve stem without departing from the spirit of the invention. It is also obvious that the invention may be carried out in a straight flow valve as well as in the angle type valve illustrated and described.

What I claim and desire to secure by Letters Patent is:

1. In a valve including a valve housing, a valve cage supported in the valve housing and provided with a cylindrical bore and a lateral port opening in the side of said cage, said bore having annular stop shoulders above and below said lateral port, a seat member in said cage having a shoulder engaging the stop shoulder below said lateral port, an adapter ring pressed into the cylindrical bore in engagement with the stop shoulder above said lateral port, and a cylindrical valve plug having close sliding contact with the adapter ring to support the valve plug in concentric relation with the seat member.

2. A valve including a valve housing, a valve cage in the valve housing a cylindrical bore and a lateral port, a valve seat in the valve cage, an adapter ring pressed into the end of the bore opposite said seat and having upper and lower inwardly extending guide ribs provided with longitudinal grooves, and a plug type valve slidable in the adapter ring in close engagement with the guide ribs to retain said valve in concentric alignment with said seat.

3. In a valve including a valve housing, a valve cage in the valve housing having a cylindrical bore and radial ports extending through the wall of the cage, said cage having annular stop shoulders above and below said ports, a valve seat member having a shoulder engaging the shoulder below said ports, an adapter ring pressed into the valve cage in seating engagement with the shoulder above said ports and having upper and lower inwardly extending annular guide ribs and provided with longitudinal grooves, and a plug type valve slidably retained by said guide ribs in concentric alignment with said seat member.

4. A valve including a valve housing, a valve cage supported in the valve housing and provided with a cylindrical bore and a lateral opening in the side of said cage, a seat in said cage located in axial alignment with the cylindrical bore on one side of the lateral opening, an adapter ring inset in the opposite end of the cylindrical bore, a cylindrical valve plug slidably retained in the adapter ring and having a seating surface enengaging said seat, a neck on the valve plug having an annular groove forming a head, a cross head provided with a laterally opening undercut recess engaging said head, and an actuating stem connected with the cross head for moving the valve plug to and from contact with said seat.

GWYNNE RAYMOND.